(12) United States Patent
Rossberg et al.

(10) Patent No.: US 7,248,974 B2
(45) Date of Patent: Jul. 24, 2007

(54) MEASURING INSTRUMENT AND METHOD OF MEASURING FLOWS

(75) Inventors: Axel G. Rossberg, Freiburg (DE); Kilian Bartholome, Freiburg (DE); Jens Timmer, Freiburg (DE); Rene Friedrichs, Ladenburg (DE); Frank Buhl, Gottingen (DE); Jorg Herwig, Adelebsen (DE)

(73) Assignee: ABB Patent GmbH, Ladenburg (DE)

( * ) Notice: Subject to any disclaimer, the term of this patent is extended or adjusted under 35 U.S.C. 154(b) by 141 days.

(21) Appl. No.: 10/942,996

(22) Filed: Sep. 17, 2004

(65) Prior Publication Data

US 2005/0114055 A1    May 26, 2005

(30) Foreign Application Priority Data

Sep. 19, 2003   (DE) ................ 103 43 958

(51) Int. Cl.
*G01F 1/00*   (2006.01)
(52) U.S. Cl. ...................................... 702/46
(58) Field of Classification Search .............. 702/46
See application file for complete search history.

(56) References Cited

U.S. PATENT DOCUMENTS

| | | | |
|---|---|---|---|
| 3,717,869 A * | 2/1973 | Batz | 341/11 |
| 4,613,826 A * | 9/1986 | Masuko et al. | 331/14 |
| 4,930,064 A * | 5/1990 | Tanaka et al. | 363/161 |
| 5,005,427 A | 4/1991 | Ohmae | |
| 5,343,404 A | 8/1994 | Girgis | |
| 2002/0129661 A1 | 9/2002 | Clarke et al. | |

FOREIGN PATENT DOCUMENTS

DE       37 13523 A1      10/1987

* cited by examiner

*Primary Examiner*—John Barlow
*Assistant Examiner*—Demetrius Pretlow
(74) *Attorney, Agent, or Firm*—Buchanan Ingersoll & Rooney PC

(57) ABSTRACT

A measuring instrument whose measuring principle is based on an oscillator, for example an eddy counter, and in which there is arranged a sensor for recording a measured signal (S(t)), which can be supplied to an evaluation unit (2), characterized in that, from the phase increments psi(tau,t), that is to say from the differences between the instantaneous values phi(t) of the phase signal derived from the measured signal S(t) in a phase extractor (18) and values phi(t-tau) time-delayed by a delayed time tau, a coupling indicator value (KI) is formed in such a way that the existence of phase coupling with a further oscillator can be detected on the latter by means of comparison with a coupling reference value (KR).

26 Claims, 3 Drawing Sheets

MEASURING INSTRUMENT AND METHOD OF MEASURING FLOWS

Figure 1:
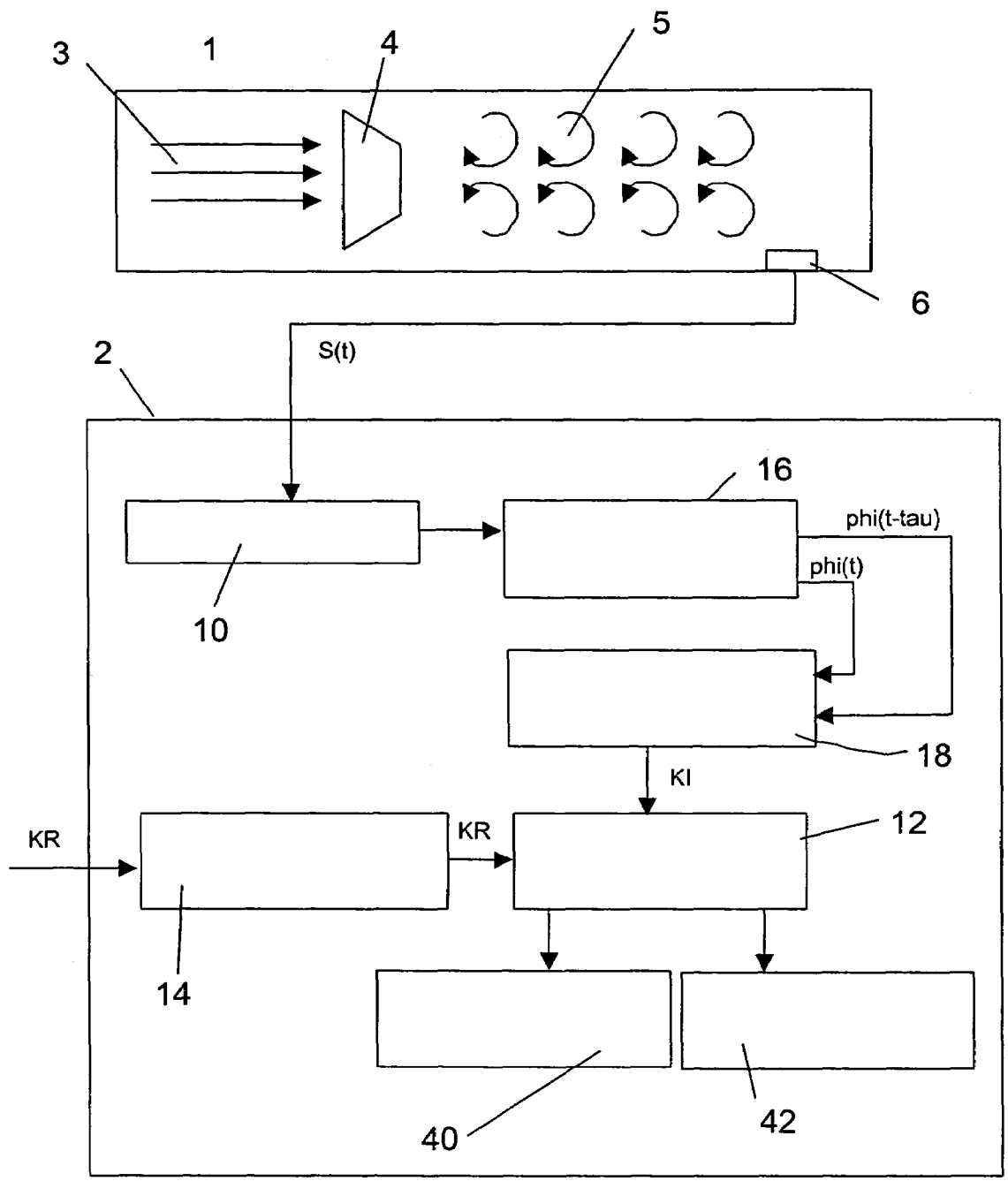

The invention relates to a measuring instrument according to the preamble of Claim 1 and to a method of measuring flow according to the preamble of Claim 15.

The invention takes as its starting point measuring instruments whose measurement principle is based on an oscillator, such as is the case, for example, in eddy counters, also called vortex flowmeters, which are used to determine volume flow or flow rate of flowing materials.

The measurement principle of vortex flowmeters is based on the fact that the separation frequency of the vortices separating behind a disruptive element located in the flow has a functional relationship with the flow velocity. From the frequency, it is possible to determine the flow velocity and, given known pipe geometry, therefore the flow through a pipe.

Considered in more detail, the functioning of a vortex flowmeter can be explained as follows: the physical effect brought about by the disruptive element is that the flow tears off at the edges of the disruptive element and therefore vortices which alternate and rotate in opposite directions are formed behind it and are carried along by the flow. A vortex street is formed, which is characterized by the frequency and phase angle of the vortex separation. This effect has been known for a long time as the Kármán vortex street.

The measurement principle on which the vortex flowmeter is based is therefore grounded in the fact that the frequency of the vortex separation is approximately proportional to the flow velocity.

In order to register the frequency of the vortex separation by measurement, use is made of the fact that the vortices separating alternately at the vortex element in the vortex counter produce local changes in velocity and pressure, which can then be registered by a suitable sensor, for example a piezoelectric pressure sensor. From the measured signal from the sensor, it is therefore possible to determine the frequency of the vortex separation and therefore the flow velocity of the medium in the pipeline.

The measured signal is normally present in the form of an analog electronic signal, and it is supplied to an evaluation unit for further processing and evaluation. In the evaluation unit, the analog electric signal is discretized and digitized by a method known per se and as a result converted into a digital signal.

The vortex street behind the disruptive element, on which the measurement principle is grounded, represents a nonlinear oscillator in physical terms. In the vortex counter, still further physical effects can additionally be observed, which result in further oscillations, also designated external oscillations here, which are also again characterized by frequency and phase angle. Such effects are, for example, power fluctuations in the line pressure, oscillations in the flow or mechanical oscillations of the pipe. Characteristic of such further oscillations is, inter alia, the fact that they occur suddenly and unpredictably and can also vanish again, and registration by measurement is not accessible or accessible only with considerable effort.

Now, it is known that the phase angle of the vortex separation in the vortex street tends to couple to the phase angle of such further oscillations (phase coupling), as a result of which an erroneous display of the flowmeter can occur. This effect of phase coupling, just outlined, can be generalized in abstract form as follows: measuring systems which are based on nonlinear oscillators often have the tendency that the phase phi1(t) of an oscillator (O1) which is part of the measuring system tends to couple to the phase phi2(t) of another, external oscillator (O2). The phases here are expressed as continuous functions of time, therefore they are not restricted to the interval of magnitude 2*pi. The time average of the time derivative of the phase is the oscillation frequency. The term phase coupling is used to designate the effect that the cyclic relative phase delta_phi[n,m] (t):=phi[n,m] (t)mod(2*pi) formed from the relative phase phi[n,m]:=n*phi1(t)−m*phi2(t) is constant, assumes only a few, preferred values or else has only a nonuniform distribution. In this case, n and m are small natural numbers. If n and m are to be specified, one also speaks of n:m phase coupling.

With regard to the vortex flowmeter, there is the understandable desire of the user to detect the occurrence of the disruptive influence on the flow measurement induced by phase coupling, in order not mistakenly to assume the then faulty flow measurement as correct, with possibly fatal consequences for control or regulation systems based on these values.

It is therefore the object of the present invention to provide a measuring instrument in which the presence of phase coupling can be detected, specifically without any knowledge about the external oscillator, and also to develop a method of measuring flows in which the presence of phase coupling is detected without any knowledge about the external oscillator.

With regard to the measuring instrument, the object is achieved by means of the characterizing features of Claim 1 and, with respect to the method, by the features of Claim 15.

According to the invention, therefore, from the measured signal S(t) it is possible to derive a phase signal phi(t) and, from the phase increments psi(tau,t), that is to say from the differences between instantaneous values of the phase signal phi(t) and values phi(t-tau) time-delayed by a delayed time tau, a coupling indicator value is formed in such a way that the existence of phase coupling with a further oscillator can be detected on the latter by means of comparison with a coupling reference value. The phase signal phi(t) is derived from the measured signal in the evaluation unit—before or after digitization—in a functional block which, in the following text, is also designated a phase extractor, specifically by using methods known per se, such as phase locked loops, embedding in the delay space, calculation of the "analytical signal" or by determining the phase from the argument of the signal after passing through a suitable complex-value filter.

By using the apparatus according to the invention, the object is achieved in a very elegant manner. Use is made here of the finding that phase coupling of two types can be present, once as what is known as hard phase coupling, in which the relative phases change only seldom or not at all over ranges of more than 2*pi—such changes are also referred to as phase jumps. Secondly, what is known as soft phase coupling can occur, in which the phase jumps, that is to say changes in the relative phases, of more than 2*pi, occur frequently.

It has now been found that a coupling indicator value can be derived from the phase increments of the measured signal, in such a way that the presence of phase coupling can be detected on the latter by means of comparison with a coupling reference value, specifically without any specific knowledge of the second, further oscillator.

The advantage of the apparatus according to the invention is that, in order to detect phase coupling, only more extensive evaluation of the information present in the measured signal has to be carried out, specifically by means of forming and further linking the phase increments, without the further oscillation having to be accessible to measurement and having to be registered.

As a further functional block, in a very advantageous embodiment of the invention, there can be a signal store for the intermediate storage of the phase signal values over a time interval, in such a way that the phase increments and the coupling indicator value can be formed with phase signal values from this signal, store. In this case, the signal store can be arranged as part of the evaluation unit or outside the evaluation unit.

In an advantageous embodiment, the coupling indicator value can be the estimated value of the variance of the phase increments (psi(tau,t)). The estimated value of the variance of the phase increments (psi(tau,t)) can in this case be formed from a function of the phase increments psi(tau,t), in particular from a sliding average of the squares of the phase increments psi(tau,t).

The coupling indicator value can also be formed from the estimated distribution function p(psi') of the integer multiple of the phase increments psi'(tau,t)=K*psi(tau,t)=K*phi(t)−K*phi(t-tau). In this case, according to a particularly advantageous embodiment, the estimated distribution function p(psi') of the integer multiples of the phase increments can be formed from a histogram.

The coupling reference value is advantageously determined in a reference measurement and stored in a reference value store for further processing.

According to a very advantageous embodiment, the evaluation unit comprises a display unit for displaying, the presence of phase coupling. The user of the flowmeter therefore receives an indication of the presence of phase coupling. He is warned that the measured values determined for the flow may be erroneous on account of the phase coupling. The display can be configured in such a way that it displays the presence and also the absence of phase coupling, so that the user is always informed accurately by the display about the trustworthiness of the flow measurement.

Of course, the evaluation unit can also comprise a data interface for transmitting the information about the presence of phase coupling to a central unit. The central unit is advantageously the same one that also processes the measured values of the flow further, for example a process computer. In the central unit, for example the measured value of the flow can then be ignored until the information about the presence of phase coupling is transmitted, in order to avoid errors in this way.

The method of measuring flows according to the invention is characterized in that, from the phase increments psi(tau,t), that is to say from the differences between instantaneous values phi(t) of the phase signal derived from the measured signal S(t) in a phase extractor and values phi(t-tau) time-delayed by a delayed time tau, a coupling indicator value is formed in such a way that the existence of phase coupling with a further oscillator is detected on the latter by means of comparison with a coupling reference value.

In this case, the phase signal values can be stored temporarily over a time interval in a signal store arranged inside or outside the evaluation unit, in such a way that the phase increments and the coupling indicator value are formed with phase signal values from this signal store.

The coupling indicator value formed can be the estimated value of the variance of the phase increments psi(tau,t).

However, the coupling indicator can also be formed from the estimated distribution function p(psi') of the integer multiples of the phase increments psi'(tau,t)=K*psi(tau,t)=K*phi(t)−K*phi(t-tau).

Further advantageous refinements and improvements of the invention and further advantages can be gathered from the subclaims.

By using the drawings, in which two exemplary embodiments of the invention are illustrated, the invention and further advantageous refinements and improvements and advantages of the invention will be explained and described in more detail.

IN THE DRAWINGS

Figure 2:
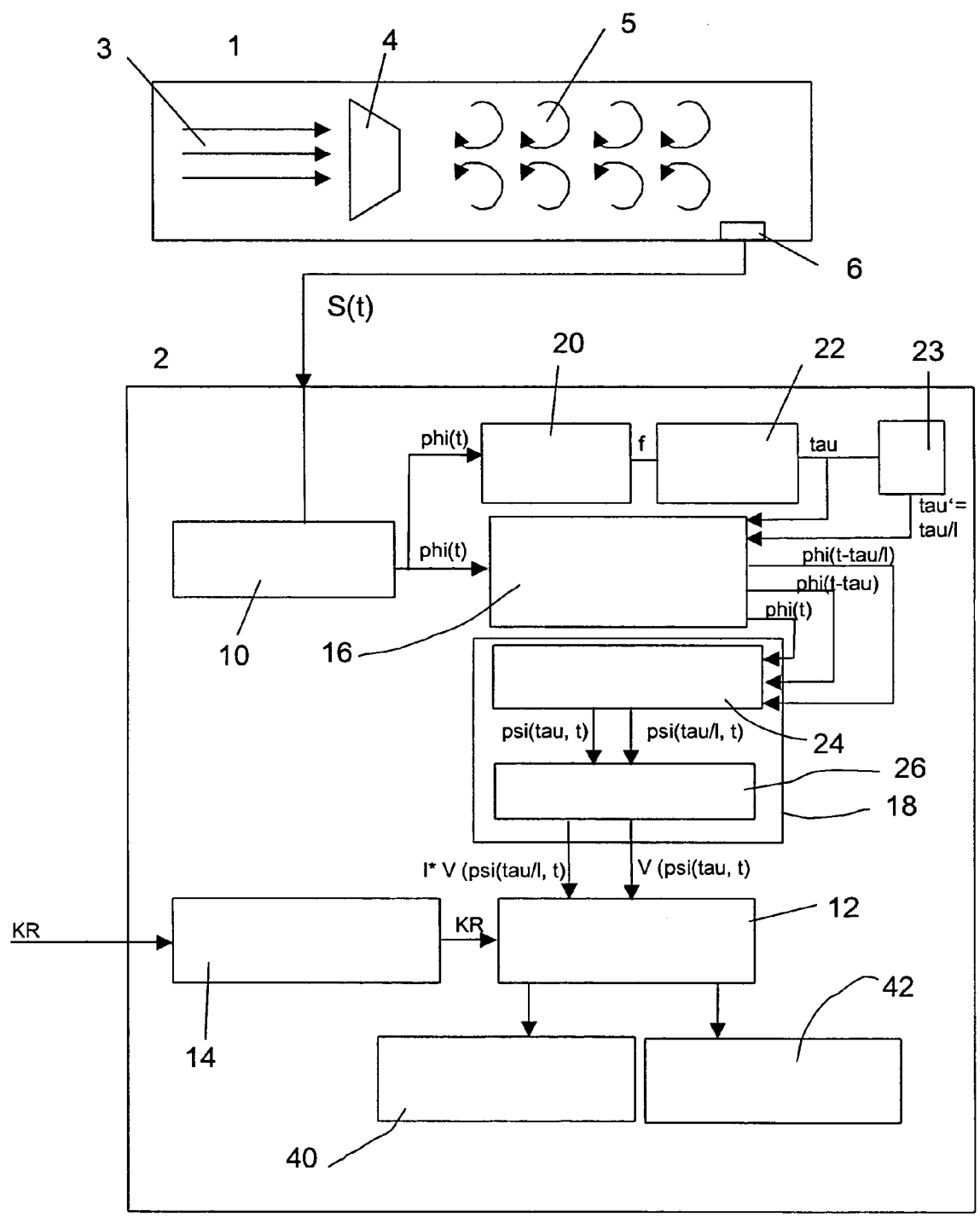
Figure 3:
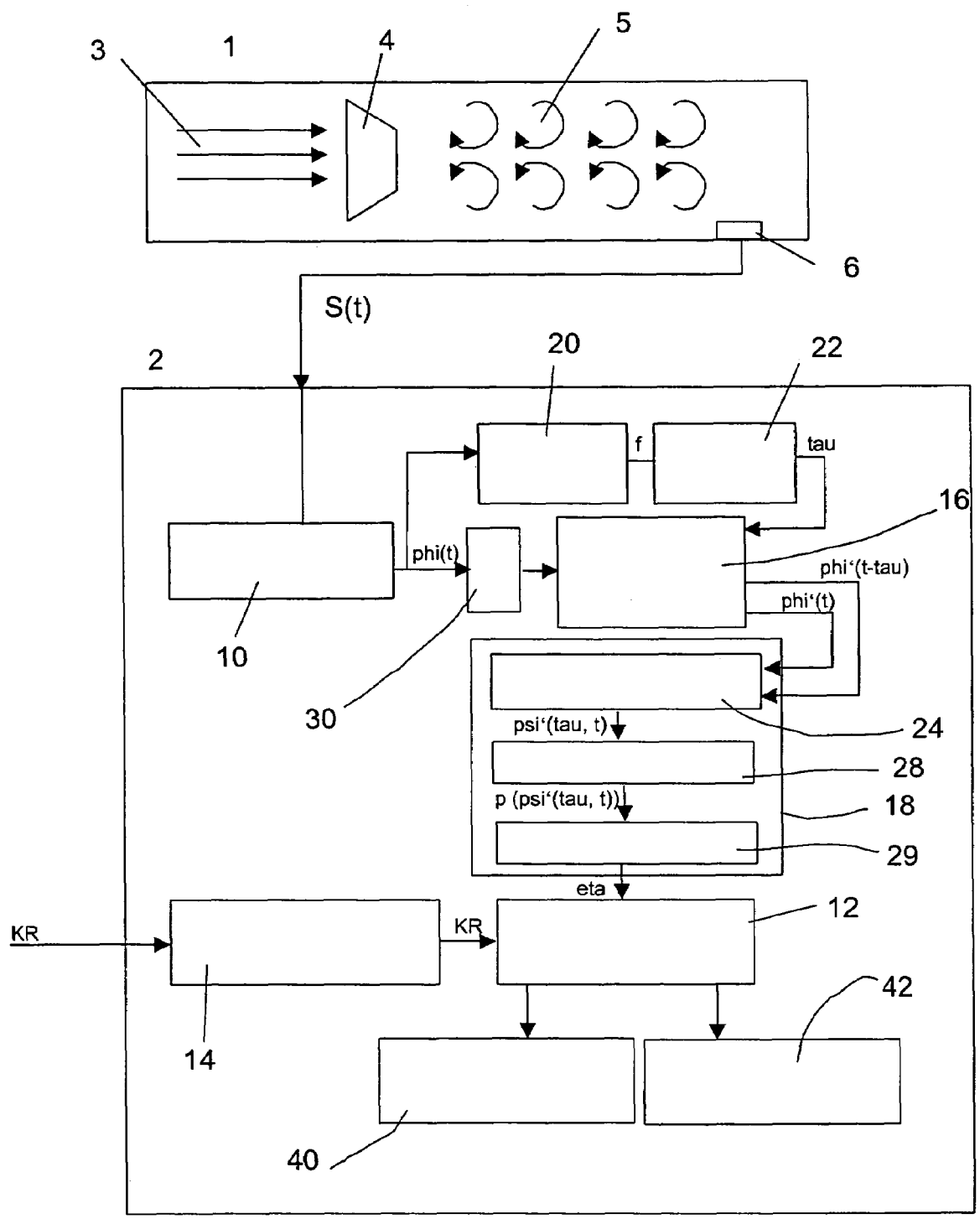

FIG. 1 shows the basic structure of a vortex counter and a block diagram of the processing according to the invention of the measured signal in order to derive the information about the presence of phase coupling, FIG. 2 shows the basic structure of a vortex counter and the block diagram of a first variant of the processing according to the invention of the measured signal, here to derive the information about the presence of hard phase coupling, and FIG. 3 shows the basic structure of a vortex counter and the block diagram of a second variant of the processing according to the invention of the measure signal, here to derive the information about the presence of soft phase coupling.

FIG. 1 shows an eddy counter flowmeter, which is constructed as a vortex counter. A flowing medium 3 flows through the measuring pipe 1 and strikes the disruptive element 4, which has a trapezoidal cross section here and is arranged centrally in the centre of the pipe. Of course, the ability of the invention to be implemented is not restricted to the specific form of the disruptive element, instead all forms and arrangements of disruptive elements known in the prior art can be used. Then, behind the disruptive elements 4, vortices form, which are designated as Kármán vortex street 5. A piezoelectric sensor 6 measures the periodic pressure fluctuations which arise as a result of the vortex separation and thus generates a measured signal S(t), which is passed on to an evaluation unit 2.

This evaluation unit comprises a phase extractor 10, a signal buffer 16, a coupling indicator value former 18, a coupling reference value store 14, a comparison device 12, a phase coupling display 40 and a data interface 42.

In the phase extractor 10, the phase signal phi(t) is derived from measured signal S(t). The phase signal phi(t) is then supplied to the signal buffer 16, in which it is stored during a time interval T. The time variation of the phase signal phi(t) over a time interval T is therefore available in the signal buffer. At a time t from the time interval T, it is therefore possible to retrieve from the signal buffer the& value of the phase signal phi(t) at this time, and also the phase signal values phi(t-tau) preceding this time t by a time interval tau, that is to say time-delayed by the time interval tau.

A phase signal value phi(t) and the phase signal values phi(t-tau) time-delayed with respect thereto are supplied from the signal buffer 16 to the coupling indicator value former 18. In the latter, the coupling indicator value KI is formed and, in the comparison device 12, in accordance with the rules deposited there, is compared with a coupling reference value KR from the coupling reference value store 14. The coupling reference value KR has previously been determined externally and stored in the coupling reference value store 14. The result of the comparison is the finding that phase coupling is present or that no phase coupling is present.

The information about the presence of phase coupling is conducted from the comparison device 12 to a phase coupling display 40 and displayed to the user there in a suitable manner. For example, a text message can be presented on a display, for example "phase coupling". Alternatively or additionally, a warning lamp can light up or flash. Additionally, an acoustic warning can also be given.

In parallel with this, the information about the presence of phase coupling is transmitted to a data interface 42, which then passes it on in suitably encoded form to a higher-order data-processing or process control system. The data interface 42 can be any data interface which is known and usual in the process industry, in particular for example a serial or parallel interface or a field bus coupling, but also a wire-free data interface, such as a Bluetooth interface.

FIG. 2 shows, as a block diagram, a particular embodiment of the processing according to the invention of the measured signal in the evaluation unit 2 for detecting hard phase coupling.

For the purpose of better understanding, first of all, some fundamental thoughts relating to the method of detecting hard phase coupling should be presented here:

Ideally, the phase of an uncoupled oscillator grows linearly with time, that is to say, for example, phi(t)=omega1*t. In this case, omega1 is defined as the long-term time average of the time derivative of phi(t). The phase determined from a measured signal derived from the oscillator is typically not identical to the phase of the oscillator, but differs only slightly therefrom. The deviations are restricted. For real, and coupled, nonlinear oscillators, however, this linear drift of the phase has superimposed on it a random movement ("random walk") which, for example, can be caused by dynamic noise in the oscillator or else by the nonlinear dynamics of the oscillator itself. This random walk leads to |phi(t)-omega1(t)| growing over all the limits over large time intervals.

In the case of hard coupling to an external oscillator O2, this random walk is suppressed.

The suppression of the random walk is detected by means of a method which is presented as a block diagram in FIG. 2 and whose functioning will now be described.

First of all, for a suitably selected delay tau, the current variance of the phase increment psi(tau,t):=phi(t)−phi(t-tau) is estimated. In order to estimate the variance, for example, the average square fluctuation of psi(tau,t) in the time interval lying a short time back can be used. Alternatively, an appropriate sliding average can be used.

The estimated value V of the variance of psi(tau,t) is compared with a reference value KR which is stored in the measuring instrument and which, for the uncoupled oscillator, corresponds to the expected value of V. Suppression of the random walk by the coupling to an external oscillator is detected from the fact that the value of V lies below KR (even taking account of the measurement uncertainty).

For the suitable selection of tau, the following is true: in order even to be able to detect weak coupling, tau should be selected to be approximately sufficiently large for KR to be at least of the order of magnitude of $2*pi^2$. In order to improve the response of the detection method, it may be expedient to select smaller values of tau.

In vortex flowmeters, the delay tau is suitably selected to be inversely proportional to the frequency of the vortex separation, the frequency being calculated for example by averaging over the interval of length T. As follows from hydrodynamic considerations, V0 then depends only on the Reynolds number Re of the pipe flow, and this dependency is weak. Therefore, an approximate value of Re is adequate for the determination of KR. The Reynolds number can be calculated either given a known flow and fluid or determined directly from the signal.

The reference value KR can be determined, inter alia, by one of the following partial methods:

a) The reference value is determined by the manufacturer in a reference measurement and stored electronically in the measuring instrument.

b) The user determines the reference value in a training phase. For this purpose, the user starts a training routine with fixed or user-determined run time in the uncoupled state. The reference values V0 are calculated from the data recorded in the run time.

c) Use is made of the fact that the variance of psi(tau,t) in the uncoupled state grows approximately linearly with tau. For instance, KR is selected as 1 times a current estimated value of the variance of psi(tau/1,t), where l>1, for example l=2.

In the arrangement according to the invention as shown in FIG. 2, the method outlined above is implemented as follows:

From the phase signal phi(t), the vortex frequency is formed in a frequency former 20 and, from this frequency, the delay time tau is formed in a delay former 22. Together with the phase signal phi(t), the delay time tau is supplied to the signal buffer 16. The phase signal phi(t) and the time-delayed phase signal phi(t-tau) are both supplied from the signal buffer 16 to an incremental former 24 within the KI former 18, which forms the phase increment psi(tau,t).

The variance estimator 26 uses the phase increment psi(tau,t) to form the estimated value of the phase increment. This is the coupling indicator value KI, in the specific case here also designated V.

The coupling reference value KR from the KR store 14 and the coupling indicator value V from the variance estimator 26 are supplied to the comparison device 12. In the latter, a comparison is made to see whether KR is greater than or less than V. Phase coupling is present if KR is greater than V, otherwise there is no phase coupling.

As described above under a) and b), the coupling reference value KR can be obtained from comparative measurements and stored in the reference value store 14. However, as described above under c), it can also be selected as l times a current estimated value of the variance of psi(tau/l,t), with l>1, for example l=2. In this case, the new delay time tau'=tau/l is formed from the delay time tau in the fraction former 23 and used to form the phase increment in the signal buffer 16. The variance estimator 26 then forms the estimated value of the variance V(psi(tau/l,t)), multiplies this by l and supplies this value to the comparison device 12 as reference value. In this case, the reference value KR therefore does not come from the KR store 14 but likewise from the-variance estimator 26.

Which way is followed in order to form the coupling reference value KR is defined in the internal control system of the evaluation unit 2. Said control system is connected to all the functional blocks present in the evaluation unit 2 but is not shown in FIGS. 1 to 3 for reasons of improved clarity.

FIG. 3 shows as a block diagram a further special embodiment of the processing according to the invention of the measured signal in the evaluation unit 2, here in order to detect soft phase coupling.

Here, too, for the purpose of better understanding, first of all some fundamental thoughts relating to the method of detecting soft phase coupling should be presented:

The method makes use of the fact that, in the case of soft phase coupling, phase jumps occur frequently. By means of the detection of phase jumps, soft phase coupling is detected. The following method is used for the detection of phase jumps:

From the estimated phase phi(t), the variable phi'(t):=K phi (t) is calculated, K being determined by the following rule: for n:m phase coupling without symmetry, K=n. If, on account of symmetries, the phase phi1(t) is equivariant with respect to a phase shift by 2 pi/l, then the smallest common multiple of n and l should be selected for K.

First, for a suitably selected delay tau, the distribution function (probability density) of the phase increment psi (tau,t):=phi'(t)-phi'(t-tau) is estimated. In order to estimate the distribution function, use can be made, for example, of a histogram, which can be determined by means of sliding averaging, for example.

The estimated distribution function p(psi) is then examined to see whether it has a multimodal structure characteristic of phase jumps with maxima at intervals of about 2 pi.

This is done, for example, by calculating a variable eta, defined by $$eta = 1/u(0) * \sum_{k=-\infty}^{k=+\infty} [u(2*k*pi) - u((2*k-1)*pi)] \text{ where}$$

$$u(beta) := \int_{-\infty}^{+\infty} p(psi) * p(psi + beta) \, d \, psi$$

The value calculated in this way is compared with a reference value eta0, which is stored in the measuring instrument and which, for the uncoupled oscillator, corresponds to the expected value of eta. The occurrence of phase-jumps as a result of coupling to an external oscillator is detected by the fact that the value of eta then lies above eta0 (even taking account of the measurement error).

For the suitable selection of tau, similar considerations apply to those presented above for the case of hard coupling.

The reference value eta0 can, inter alia, be determined by one of the following methods:
a) The reference value is determined by the manufacturer from a reference measurement and stored electronically in the measuring instrument.
b) The user determines the reference value in a training phase. For this purpose, the user starts a training routine with a fixed or user-determined run time in the uncoupled case. The reference value eta0 is calculated from the data recorded in the run time.

To describe the implementation of this method in the arrangement according to the invention according to FIG. 3, in the following text only the differences from the arrangements previously described in accordance with FIG. 1 and FIG. 2 will be considered.

In the arrangement according to FIG. 3, the signal buffer 16 is supplied with the phase function multiplied by the factor K in a phase multiplier 30, phi'(t)=K*phi (t). The delay time tau, on the other hand, is derived from the original phase signal phi(t), as already described above in the case of FIG. 2. Instead of the variance estimator in FIG. 2, the KI former in the embodiment according to FIG. 3 contains a distribution function estimator 28, which determines the estimated distribution function p(psi'(tau,t)) of the phase increment psi(tau,t). The estimated distribution function p(psi'(tau,t)) is then supplied to a further function block, here called the eta former, which, as described above, determines the variable eta, which then represents the coupling indicator value KI.

Within the comparison device 12, the coupling indicator value KI, or else eta here, is compared with a coupling reference value KR, also called eta0 here, from the KR store 14. Phase coupling is present if the value of eta is greater than the reference value eta0.

In general, the evaluation unit 2 with the functional blocks contained in it can be implemented as an electronic circuit or as a program within a microcomputer. Details as to how such electronic circuits or programs have to be built up and implemented are known to those skilled in the art; they are based on the circuits and programming techniques known in the prior art.

In a further variant, not illustrated here by a figure, the evaluation unit 2 can contain both the function blocks for detecting hard phase carping and those for detecting soft phase coupling. Using such an evaluation unit 2, it is possible to cover the entire region of phase coupling completely.

The invention claimed is:

1. A measuring instrument performing measurements using a measuring principle based on an oscillator, the measuring instrument comprising:
a sensor that records a measured signal (S(t)) of a flowmeter;
a phase extractor that extracts a signal phi(t) from the measured signal (S(t));
a buffer that delays the signal phi(t) to produce a time-delayed signal phi(t-tau);
a coupling indicator that generates a coupling indicator value based on the signal phi(t) and the time-delayed signal phi(t-tau); and
a comparison device that compares a coupling reference value to the coupling indicator to detect phase coupling.

2. The measuring instrument according to claim 1, comprising a signal store that stores signal values for phi(t) and phi(t-tau) over a time interval such that phase increments and the coupling indicator value (KI) are formed with phase signal values from the signal store.

3. The measuring instrument according to claim 2, wherein the coupling indicator value (KI) is an estimated value (V) of a variance of phase increments (psi(tau,t)).

4. The measuring instrument according to claim 3, wherein the estimated value (V) of the variance of the phase increments (psi(tau,t)) is formed from a sliding average of a function of the phase increments (psi(tau,t)).

5. The measuring instrument according to claim 3, wherein the estimated value (V) of the variance of the phase increments (psi(tau,t)) is formed from a sliding average of the squares of the phase increments (psi(tau,t)).

6. The measuring instrument according to claim 2, wherein the coupling indicator (KI) is formed from an estimated distribution function p(psi') of the integer multiple of the phase increments (psi'(tau,t)=K*psi(tau,t)=K*phi(tau,t)-K*phi(t-tau)).

7. The measuring instrument according to claim 6, wherein the estimated distribution function (p(psi')) of an integer multiple of the phase increments is formed from a histogram.

8. The measuring instrument according to claim 1, wherein the coupling reference value (KR) is a multiple (l times) of the estimated value (V) of the variance of phase increments formed with a fraction of the delay time (psi (tau/l,t)=phi(t)−phi(t-tau/l)).

9. The measuring instrument according to claim 1, wherein the coupling reference value (KR) is determined in a reference measurement and is stored in a reference value store.

10. The measuring instrument according to claim 1, wherein the delay time (tau) is inversely proportional to a vortex frequency (f).

11. The measuring instrument according to claim 10, wherein the signal buffer is part of an evaluation unit.

12. The measuring instrument according to claim 10, wherein the signal buffer is arranged outside an evaluation unit.

13. The measuring instrument according to claim 1, wherein the evaluation unit comprises a display unit for displaying the presence of phase coupling.

14. The measuring instrument according to claim 13, wherein the evaluation unit comprises a data interface for transmitting the information about the presence of phase coupling to a central unit.

15. A method of measuring a flow through flowmeters whose measuring effect is based on an oscillator comprising:
recording a measured signal (S(t)) of at least one of said flowmeters;
extracting a phase signal phi(t) from the measured signal (S(t));
delaying the signal phi(t) to produce a time-delayed signal phi(t-tau);
generating a coupling indicator value based on the signal phi(t) and the delayed signal phi(t-tau); and
comparing a coupling reference value to the coupling indicator value to detect phase coupling; and
displaying a comparison result.

16. The method according to claim 15, comprising:
storing signal values for phi(t) and phi (t-tau) over a time interval, and in a signal store arranged inside or outside an evaluation unit, such that phase increments and the coupling indicator value (KI) are formed with the phase signal values from this signal store.

17. The method according to claim 16, wherein the coupling indicator value (KI) that is formed is an estimated value (V) of a variance of phase increment values (psi(tau, t)).

18. The method according to claim 17, comprising:
forming the estimated value (V) of the variance of the phase increment values (psi(tau,t)) from a sliding average of a function of the phase increments (psi(tau ,t)).

19. The method according to claim 17, comprising:
forming the estimated value (V) of the variance of the phase increment values (psi(tau,t)) from a sliding average of the squares of phase increments (psi(tau,t)).

20. The method according to claim 16, comprising:
forming the coupling indicator (KI) is formed from an estimated distribution function p(psi') of an integer multiple of the phase increments (psi'(tau,t) =K*psi (tau,t)=K*phi(tau,t)−K*phi(t-tau)).

21. The method according to claim 20, comprising:
forming the estimated distribution function (p(psi')) of the integer multiple of the phase increments from a histogram.

22. The method according to claim 15, comprising:
forming the coupling reference value (KR) that is formed is a multiple (1 times) of an estimated value (V) of a variance of phase increments formed with a fraction of a delay time (psi(tau/l,t)=phi(t)−phi(t-tau/l)).

23. The method according to claim 15, comprising:
determining a coupling reference value (KR) in a reference measurement and forming the coupling reference value in a reference value store.

24. The method according to claim 15, comprising:
forming the delay time (tau) to be inversely proportionally to the vortex frequency (f).

25. The method according to claim 15, wherein the presence of phase coupling is transmitted via a data interface to a central unit.

26. The method according to claim 15, wherein the displaying sites comprises:
displaying the presence of phase coupling through a display unit.

* * * * *